May 9, 1961           C. R. JAGEMAN           2,983,639

PROCESS FOR WELDING PLASTIC PIPE

Filed June 28, 1957

INVENTOR.
CHARLES R. JAGEMAN
BY
Charles L. Lovercheck
ATTORNEY

ABSTRACT

United States Patent Office 2,983,639
Patented May 9, 1961

2,983,639

PROCESS FOR WELDING PLASTIC PIPE

Figure 1:
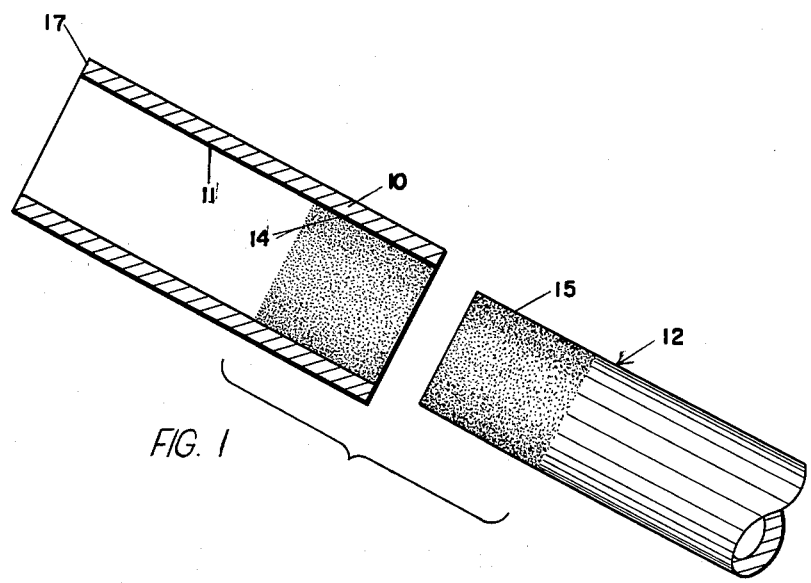

Charles R. Jageman, Erie, Pa., assignor to Pyramid Industries, Inc., Erie, Pa., a corporation of Pennsylvania Filed June 28, 1957, Ser. No. 668,648

4 Claims. (Cl. 154—116)

This invention relates to a method and means for joining articles of suitable plastic material and, more particularly, to a method of joining plastic cylindrical members and pipes.

It has been customary to join parts of plastic material by dissolving the material of one piece which is to engage the surface of another piece and, when the parts are put together, heat has sometimes been applied. When the process of joining plastic parts is carried out in this manner, the solvent material is usually dried out by the heat and the heat is not applied to the surface to be joined itself. It has been discovered that by igniting the solvent, the heat can be more directly applied to the surface to be joined and the solvent can be removed more readily, therefore resulting in a much better quality joint than is possible with any other method heretofore used.

It is, accordingly, an object of this invention to provide a method for uniting links of cylindrical members and pipes which is simple, economical, and commercially feasible.

Another object of this invention is to provide a method and means for joining or connecting parts made of thermoplastic materials, more particularly, polyethylene, in such a manner to produce a joint which is permanent, strong, and made without clamps.

Still another object of this invention is to provide a method of integrating parts of plastic material without the use of extraneous or conventional plastic bonding agents or adhesives.

A further object of the invention is to provide a method of joining hollow or substantially hollow articles of polyethylene or like plastic by joining parts, dissolving the material by means of a solvent, and igniting the solvent prior to bringing the parts to be engaged into engagement with each other.

Other objects and advantages of the invention will become apparent in the course of the following description of the invention, taken in connection with the drawing, which illustrates, somewhat diagrammatically, how the parts are prepared and brought together for uniting according to the invention. It is understood that the method of joining plastics may be varied from the specific examples given within the breadth of the appended claims.

Figure 2:
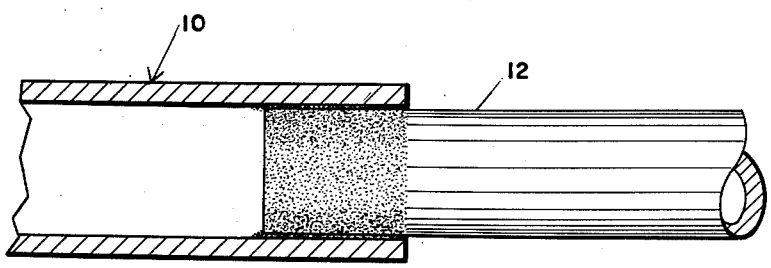

In the drawing:

Fig. 1 shows two parts to be joined with their surfaces coated with the coating material; and Fig. 2 shows the two parts joined together.

The invention is disclosed as a method of joining pipes; however, the same method could be used under proper conditions for joining sheet material or other shapes of material.

Now with more specific reference to the drawing, an outside fitting 10 is shown in the shape of a hollow cylindrical member having a bore 11 therethrough. A pipe 12 has an outer peripheral diameter approximately equal to the inside diameter of the bore 11. The pipe 12 could be a solid cylindrical rod instead of pipe and the inside bore 11 of the fitting 10 could be hexagonal or some other non-circular shape. The outside surface of the hollow pipe 12 could be of a complementary shape to the inside surface of the bore 11 so that the surfaces of the two members would meet. This would work very well since it is desirable that the two parts not be rotated relative to each other during their assembly.

Prior to the insertion of the pipe 12 into the fitting 10, a portion 14 of the inside surface of the bore 11 and a portion 15 of the outside surface of the pipe 12 are coated with materials known as part I and part II. When the material of the fitting 10 and the pipe 12 is polyethylene, the part I material will be made up of a liquid hydrocarbon; for example, one of the following materials:

Example I—gasoline
Example II—kerosene
Example III—benzene
Example IV—toluene
Example V—decalin Most of the liquid hydrocarbons will be operative as well as the above specific examples.

Part II will be made up of one or more of the above materials with polyethylene material dissolved therein to form a thick paste solution or, in the case of joining plastic other than polyethylene, plastic similar to that to be joined would be dissolved in one or more of the materials.

The process is carried out as follows:

In order to join the ends of the pipe 12 and the fitting 10 to form a coupling, the end portion 15 of the pipe 12 and the inside surface 14 of the fitting 10 are wiped clean. Both peripheral bandlike surface areas 14 and 15 extend along the axis of the pipe for about three-quarters of an inch. Then, part I is applied to the surfaces 14 and 15 by means of a brush or other convenient means. This is necessary because of the restrictive flow of air on the inside of the fitting 10 over the area 14. The fitting 10 and the pipe 12 are then allowed to stand for approximately two minutes or more while part I reacts with the material of the fitting 10 and the pipe 12. After the fitting 10 and the pipe 12 have stood for at least two minutes, part II is applied to the inside surface 14 of the fitting 10 to the thickness of about at least one-sixteenth of an inch and part II is also applied to the external surface of the portion of the pipe 12 to be inserted into it. The material on the surfaces 14 and 15 is then ignited and allowed to burn freely for twenty to thirty seconds. The fitting 10 is then held at a slight incline to a horizontal with an end 17 upward. After the surfaces 14 and 15 have burned for approximately twenty to thirty seconds, the pipe 12 is quickly inserted into the fitting 10 without relative rotation between the pipe 12 and the fitting 10.

To facilitate cooling, the two parts may be quenched with water or water may be run through the pipe or the two parts can be allowed to cool by natural convection in the air for approximately five minutes before testing.

Part I dissolves the skins of the surfaces 14 and 15 and swells the material thereof. Part II is dissolved polyethylene and, by igniting the solvent therein, it burns the solvent up rapidly and also softens the material by heat, thereby facilitating the connection of the joint and avoiding the necessity of clamping. The resulting joint will be as strong or stronger than the pipe itself.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A method of joining two pipes made of polyethylene material comprising coating an area of the inside surface of one said pipe with an inflammable solvent for said material, coating an area of the outside surface of the other said pipe with a solvent for said material taken from the group of benzene, gasoline, kerosene, and toluene, igniting said solvent on both said pipes, and inserting said pipe having the outside surface coated into said pipe having the inside surface coated.

2. A method of joining a pipe made of polyethylene material and a fitting made of the same material comprising coating an area of the inside surface adjacent an end of said fitting with a solvent for said material taken from the group of benzene, gasoline, kerosene, and toluene, coating an area of the outside surface of said pipe adjacent an end with an inflammable solvent for said material, coating said coated surfaces with an inflammable solvent for said material having some said material dissolved therein, igniting said solvents, and, after a predetermnied time, inserting said pipe into said fittings.

3. The method recited in claim 2 wherein said fitting is at an inclined angle to a horizontal with said coated end in a lower position.

4. A method of joining a coupling made of polyethylene to a pipe made of polyethylene comprising coating an inner peripheral bandlike surface of said coupling with an inflammable polyethylene solvent taken from the group of benzene, gasoline, kerosene, and toluene, coating an outer peripheral bandlike surface of said pipe with said solvent, coating said coated areas with an inflammable liquid polyethylene solvent having polyethylene material dissolved therein, igniting said solvents, holding said fitting at an angle to a horizontal, and inserting said pipe thereinto while both are ignited.

References Cited in the file of this patent

UNITED STATES PATENTS

| | | |
|---|---|---|
| Re. 13,219 | Chapman | Sept. 21, 1909 |
| 2,383,230 | Voke | Aug. 21, 1945 |
| 2,384,848 | Peters | Sept. 18, 1945 |
| 2,403,995 | Peters | July 16, 1946 |
| 2,409,283 | Hudson | Oct. 15, 1946 |
| 2,498,831 | Veitch | Feb. 28, 1950 |
| 2,565,316 | Lucas et al. | Aug. 21, 1951 |
| 2,597,704 | Carlson | May 20, 1952 |
| 2,628,172 | Jenett | Feb. 10, 1953 |
| 2,721,600 | Perryman | Oct. 25, 1955 |
| 2,799,610 | Magill | July 16, 1957 |

FOREIGN PATENTS

| | | |
|---|---|---|
| 567,360 | Great Britain | Jan. 24, 1945 |

OTHER REFERENCES

Hahn et al.: Ind. and Eng. Chem., June 1945, vol. 37, No. 6, pages 526–533, page 530 relied on.